Figures 1, 2:
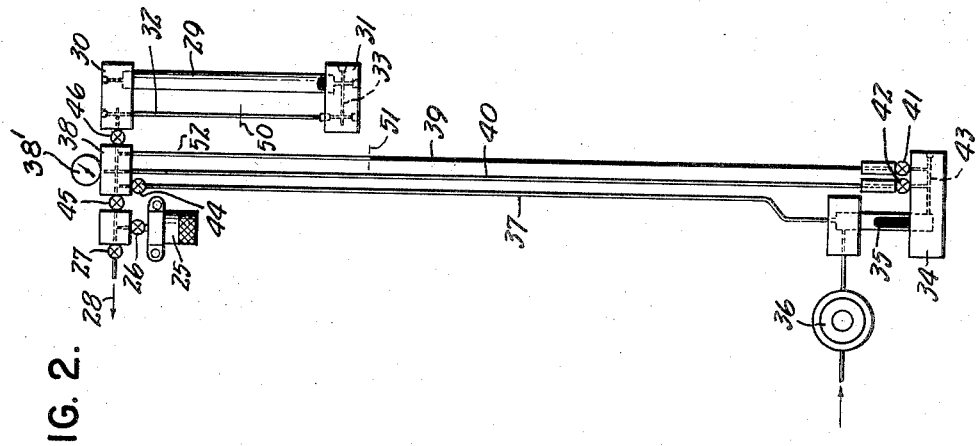

April 8, 1958

H. E. JOHNSON 2,829,515

POROSIMETER

Filed July 21, 1954

INVENTOR
HAROLD E. JOHNSON
BY
ATTORNEYS

United States Patent Office 2,829,515
Patented Apr. 8, 1958

2,829,515
POROSIMETER

Harold E. Johnson, Dallas, Tex.

Application July 21, 1954, Serial No. 444,796

18 Claims. (Cl. 73—38)

My invention relates to a porosimeter, or volumeter, and method of determining the porosity of porous substances.

Porosimeters, as heretofore made, which are reasonably accurate, require considerable manipulation, calculation and time for determining porosity, and others, which are more direct and which require less manipulation, calculation and time, are often lacking in accuracy.

It is an object of the invention to provide a novel method of determining the porosity of porous substances which is simple, requires little calculation, is direct and accurate in results.

It is another object of my invention to provide an improved porosimeter, which is very simple in construction, easy to manipulate and which yields accurate results.

More specifically, it is an object to provide a porosimeter, which requires the simplest of calculations employing the results of very simple direct readings of the apparatus to determine the porosity of a substance.

Another object is to provide a porosimeter, which employs a gas under relatively heavy pressure to permeate a porous sample, and means for readily determining the amount of gas under pressure required to permeate the sample and thus indicate porosity.

Other objects and various features of novelty and invention will be hereinafter pointed out or will become apparent to those skilled in the art.

Briefly stated, in a preferred form of the invention, the method consists essentially of isolating or employing a relatively small accurately reproducible volume of gas under a relatively high accurately reproducible reference pressure, which gas is applied to the sample of material, the porosity of which is to be determined. Before applying the gas under pressure to the sample, the latter may be evacuated so that there is practically no residual air in the sample and the volume of the gas under pressure that permeates the sample and fills the sample holder will be a reliable indication of the total void space therein. After the gas under pressure has been expanded into the sample holder and the sample under test, the volume of gas employed in permeating the sample and filling the sample holder may be measured accurately.

The preferred method of determining the amount of gas under pressure employed for permeating the sample and filling the sample holder consists of compressing the expanded gas back to its original volume very accurately as by a displacing medium such as mercury forced into the gas chamber. This very accurately reproduced volume is attained by utilization of a very sensitive reference pressure balancing means, whereby the initial pressure is reproduced very accurately. The volume of displacing medium required to bring the gas to its original volume and pressure may be measured and the volume of displacing medium required is the volume of gas required to permeate the sample and fill the sample holder. This accurately measured volume subtracted from the accurately known sample holder volume gives the sand grain or solid volume of the sample which may be used in calculating the porosity of the sample under test.

In the drawings which show, for illustrative purposes only, preferred forms of apparatus for practising the invention:

Fig. 1 is a diagrammatic or schematic view of a porosimeter, illustrative of one form of the invention; and Fig. 2 is a similar view of a porosimeter in some respects simpler than that shown in Fig. 1 and illustrating a second or modified embodiment of the invention.

In the form shown in Fig. 1, there is a sample or core holder 5, of very accurately determined volume. This core holder 5 is of a contsruction to be opened up so that a core or sample of the material, the porosity of which is to be determined, may be placed therein.

As has been indicated, the invention, in the preferred form, requires that gas under relatively high pressure be introduced into the sample holder 5, and the volume of gas so introduced is accurately measured and is therefore an indication of the total void space in the core sample and core holder. For the most accurate results, it is desirable to evacuate the core holder with the sample therein, and I therefore provide a capillary connection 6 from the core holder to a manifold block 7, which has a connection through valve 8 to a vacuum pump or other means for evacuating the sample holder 5.

Compressed gas is contained in a compressed gas reservoir or displacement chamber 9, which is connected to a manifold block 10 and to a capillary passage 11 leading to the manifold block 7 and eventually to the tube 6 entering the sample holder 5. A shut-off valve 12 controls the communication between the displacement chamber 9 and the sample holder 5. The gas, which may be helium, nitrogen, or other desired gas, is introduced into the displacement chamber 9 through a pipe 13 connected to a regulated pressure gas supply. A valve 14 in the connection between the regulated gas supply and the manifold 10 controls the connection from the regulated gas supply to the displacement chamber 9. A pressure gauge 13' indicates the pressure in the displacement chamber 9. When a sufficient quantity of gas has been admitted to the chamber 9, it is held therein under pressure, and the pressure may be varied by introducing or withdrawing a displacing medium such as mercury 15 to or from the displacement chamber 9. A measuring mercury pump 16 is employed for introducing the mercury into the displacement chamber or withdrawing mercury therefrom. It is necessary, in the preferred method and apparatus, to establish some definite reproducible volume initially in the displacement chamber 9. This is accomplished by utilizing a very sensitive reference pressure balancing means. After expansion into the sample holder 5, it is necessary to increase the lowered pressure of gas in the chamber 9 up to the initial reference pressure very accurately, which in turn reproduces the initial volume very accurately. This increase in pressure is effected preferably by pumping more mercury 15 into the displacement chamber 9. The mercury pump 16 is a measuring pump so that any quantity of mercury may be pumped in or withdrawn and the amount readily read on an indicator at the pump.

The pressure in the displacement chamber 9 is readily brought to an accurately reproducible reference pressure by a sensitive pressure balance system which may consist of a capillary size manometer tube 17 with mercury or other fluid therein, as will be understood. This manometer or U-column is fitted into a manifold block 18, which has capillary passages therein connected as by means of a valve 19 with capillary passages in the manifold 10 having the connections heretofore noted. The manifold block 18 has a connection through a valve 20 and suitable piping to a constant volume gas reservoir 21 for serving as a balancing pressure in the manometer 17.

The operation of determining the porosity of a sample in the sample holder 5 may be about as follows:

The core or sample holder 5 is opened and a core or sample, the porosity of which is to be determined, is introduced into the holder 5 and the latter closed tightly. All of the valves 8, 12, 14, 19, 20 may be closed at the beginning. The valve 8 may then be opened to the vacuum pump or other evacuator so as to evacuate the air from the sample in the sample holder 5. The valve 14 may then be opened and a quantity of gas from the regulated pressure gas supply enters the displacement chamber 9. Generally speaking, the pressure of the pressure gas from the reservoir or tank will be regulated to some reasonably definite pressure, such as 100 p. s. i. When a sufficient quantity of gas, at about the regulated pressure, has entered the displacement chamber 9, the valve 14 may be closed. The valve 20 may then be opened to admit pressure fluid at about 100 p. s. i. from the constant volume reservoir 21, so that the pressure in that reservoir acts upon the mercury in one leg of the U-tube 17. The valve 19 may then be opened so as to cause the gas pressure in the displacement chamber 9 to act on the fluid in the other leg of the manometer 17. In order to balance the pressure in the displacement chamber 9 with the pressure in the constant volume reservoir, it will be a simple matter to withdraw mercury 15 from the displacement chamber or add mercury, by means of the mercury pump. When the U-tube 17 shows a balance of pressure, the valve 19 may be closed and, if desired, the valve 20 may remain open so long as determinations are being made. A reading is taken on the mercury pump at this time. Now, the valve 8 to the evacuator should be closed and the valve 12 opened so that gas under pressure in the displacement chamber 9 will pass into the sample holder 5 and permeate the core or sample therein. When the core or sample is thoroughly permeated, it is then necessary to determine how much gas under pressure was employed to permeate the sample and fill the voids in the sample holder. It will be seen that the pressure in the displacement chamber 9 will have dropped due to expansion of the gas to fill the voids in the sample and sample holder and the amount of gas at the high pressure used for filling the voids may be determined by pumping mercury into the chamber 9 until the pressure therein reaches the initial reference pressure indicated by the manometer. When the pressure in the displacement chamber 9 has been raised to near the initial pressure, as indicated by the pressure gauge 13' connected through the manifold 10 to the displacement chamber 9, the valve 19 should be opened so that, as the pressure is raised in the displacement chamber 9, the mercury in the capillary size manometer 19 might be observed. When the pressure balance is indicated, the mercury pump may be stopped and a second reading taken. The volume of mercury pumped into the chamber 9, in order to bring the pressure therein up to the initial pressure, represents the volume of gas at the high pressure required to permeate the sample holder 5 and represents the volume of voids in the holder. In order to determine the effective sand grain or solid volume of the sample, the total measured void volume is subtracted from the accurately known volume of the sample holder. With an accurately measured effective solid volume and an accurately measured bulk volume of the sample, the effective porosity of the sample, in percent, may be calculated by use of the following formula:

Percent effective porosity =

$$\frac{\text{Bulk volume} - \text{effective solid volume}}{\text{Bulk volume of sample}} \times 100$$

The bulk volume of the sample may be determined in several ways. A simple mercury pycnometer may be used in conjunction with the mercury pump 16 to measure bulk volumes.

It will be seen, therefore, that I have provided a very simple, easily manipulable apparatus for carrying out an improved and very accurate method of determining the porosity of a sample or core in the sample holder 5.

Instead of using the manometer, as shown at 17, and requiring that the level in both legs be equal, equally good results may be obtained by simply marking the level in one of the legs when desired pressure has been reached in the displacement chamber 9, and on the second pressure reading, after expansion into holder 5 and subsequent compression, the same leg of the manometer may be caused to reach the previously indicated mark so that the pressure will be exactly the same initially, and after raising the pressure after expansion. The pressure gauge 13' on the manifold 10 indicates the pressure existing in the displacement chamber 9. Valve 19 may be safely opened only when this gauge indicates a pressure approximately equal to the selected operating pressure of the porosimeter. As a matter of convenience, I may employ a pressure gauge 21' on the reservoir 21 to indicate the approximate operating pressure.

Ordinarily, it will be desirable in making tests to employ a compressed gas volume in the displacement chamber 9 just sufficient to accomplish the purpose, this for the reason that the accuracy of the instrument in enhanced by having a small volume of gas in the chamber 9.

In the form shown in Fig. 2, I accomplish the same results as heretofore described in connection with Fig. 1. In the form shown in Fig. 2, I employ the same sample or core holder 25, connected through needle valves 26 and 27 and suitable passages, to a vacuum pump or other evacuator 28. Instead of a constant volume gas reservoir, such as the reservoir 21 heretofore described, I use a much smaller yet comparatively large pressure balance reservoir 29, connected into a manifold block 30 at the top and a manifold block 31 at the bottom. Between these two manifold blocks is also a capillary pressure balance tube 32, connected at the bottom through passages in the block with the pressure balance reservoir 29. In the pressure balance reservoir is a small supply of mercury or other liquid, which may flow through the passage 33 up into the capillary tube 32 to a definite position, depending upon the relative pressure between the reservoir 29 and the calibrated tubes to be described. The pressure balance reservoir 29 and pressure balance tube 32 correspond in function to the constant volume gas reservoir 21 and the manometer 17 of Fig. 1.

Instead of employing a displacement chamber such as 9 and employing a mercury pump, I provide other means, preferably in the form of a calibrated tube or tubes, for measuring the quantity of displacing fluid, such as mercury, for raising the pressure in the gas supply. In this case, I employ a lower manifold 34 having a mercury reservoir 35 therein and connected to a regulated gas supply having a pressure regulator 36 in the pipe connections. From the connections to the gas supply and above the mercury level, I employ a connecting gas supply pipe 37, which extends upwardly into a manifold 38, which is connected by means of passages to one or more calibrated tubes 39—40. These tubes 39—40 take into the bottom manifold block 34 and there are interposed shut-off or needle valves 41—42 in the passages between the calibrated tubes and the block 34. It will be seen that there are passages 43 from the mercury reservoir 35 into the connections to the valves 41—42 so that when desired mercury may be passed up into the calibrated tubes 39—40. It will be seen that, in the gas connecting pipe 37, there is a needle or stop valve 44 and there is a needle or stop valve 45 between the block 38 and the core holder connections. There is also a valve 46 between the manifolds 30 and 38 so that the pressure in the various pipes may be transmitted to the tube of the pressure balance tube 32, as will be described.

The operation of that form of porosimeter shown in Fig. 2 may be as follows:

All of the valves may be considered as closed. Then the valves 26—27 may be opened so that the core or sample holder 25 and sample therein may be evacuated as heretofore described. The gas supply under regulated pressure may then be turned on to the mercury reservoir 35 so as to apply the regulated gas pressure thereto, and then the valve 44 may be opened so as to introduce gas from the regulated gas supply into the calibrated tubes 39—40. The valve 44 should then be closed and the valve 46 may then be opened and the pressure in the tubes 39—40 will act on top of the column of mercury in the tube 32, while the pressure from the large volume pressure balance reservoir 29 will force the mercury or other liquid up in the tube 32. One of the valves, such as the valve 41, may be opened to admit mercury from the mercury reservoir into the tube 39. Mercury is forced into or withdrawn from the tube 39, until the mercury in the balance tube 32 reaches some reference point, such as the point 50. We then note the position or reading 51 in the calibrated mercury column 39. When that reading has been made, the valve 44 has already been closed, valves 46 and 27 will be closed and the valve 45 opened. The gas held or trapped in the calibrated tubes 39—40 will then pass through the passages in the block 38, the valve 26 into the sample holder 25, so that the gas under pressure will permeate the sample and fill the sample holder 25.

In order to determine the amount of gas required to permeate the sample, I may admit the mercury into the calibrated tube 39 so that the gas therein is compressed back to approximately the original pressure as indicated by the pressure gauge 38' on the manifold 38. Valve 46 may then be safely opened and a final accurate reproduction of the original pressure obtained by bringing the mercury level in the pressure balance tube to the initial point 50 where the original calibration reading 51 in the tube 39 was taken. Therefore, if the mercury in calibrated tube 39 reaches the point 52, it will be noted that the volume of the calibrated tube 39, between the points 51—52, is the volume of gas under initial high pressure required to permeate the sample and fill the sample holder 25. Since the tube 39 is calibrated, the calibrations may read in volume units directly so that we may determine directly the volume required.

Instead of employing only a single tube 39, I may open valves 41—42 and let the volume of mercury in both of the tubes 39—40 extend up and reach a balance point. However, it will normally be easier to read a single column, as heretofore described.

It will be seen, therefore, that, in the rather simplified form of Fig. 2, we accomplish substantially the same results as with the form shown in Fig. 1. In the form shown in Fig. 2, I have done away with a measuring mercury pump, which is ordinarily quite expensive, and I have also eliminated one leg of a manometer, since the single leg 32 suffices. I also have decreased the size of the pressure balance tube 29 over the unnecessarily large reservoir 21 shown in Fig. 1.

For various reasons it may be desirable to operate the porosimeter without evacuating the core holder and core or sample. When this is done a correction factor must be determined and applied to correct for the air at atmospheric pressure in the sample and sample or core holder. An appropriate correction factor may be determined by dividing the accurately known sample holder volume by the volume of compressed gas that may be transferred into the sample holder containing only air at atmospheric pressure. By multiplying the transfer measurements by this factor, equivalent evacuated transfer measurements are obtained. Since this correction factor will change with changes in operating pressure or barometric pressure, it should be checked periodically.

When a core or sample is to be tested without evacuation, the procedure is substantially the same as heretofore described but without the evacuation step.

The method and apparatus described have used directly measured volumes of gas. However, the gas volumes could be indirectly determined by weighing the quantity of mercury or other fluid required to displace the gas and then dividing the weight by the specific gravity of mercury or other displacing fluid.

In using my method or apparatus, accuracy is promoted by isolating gas under pressure in the displacement chamber in volume just in excess of the volume required to fill the core holder and sample. Generally speaking, the greater the gas pressure employed, the greater the accuracy of the method and apparatus. Also, as stated, the less the volume of gas isolated under pressure in the displacement chamber, the more accurate the results.

The passages for gas are hardly of more than capillary size so that their volume is negligible compared with the volume of gas employed for filling the core holder and sample.

The accuracy of the sand grain or solid volume measurements made with this porosimeter is dependent primarily upon the sensitivity of the reference pressure balance system to extremely small volume changes. In addition to the operating pressure and displacement volume factors already mentioned, the sensitivity is increased by these features:

(1) The pressure balance gas reservoir should be relatively large in comparison with the displacement chamber volume.

(2) The inside diameter of the visual pressure balance tube should be capillary in size. An inside diameter of approximately one millimeter is suitable.

(3) Lower density liquids in the visual pressure balance tube give higher sensitivity. However, mercury has certain characteristics which makes it very suitable for relatively high pressures. When mercury is used, the sensitivity for a given operating pressure may be increased by inclining the visual pressure balance tube at some suitable angle.

While the invention has been described in considerable detail and preferred forms of apparatus illustrated, and described as porosimeters, it is to be understood that the method and apparatus may and do function as volumeters and that various changes and modifications may be made within the scope of the invention as defined in the appended claims.

I claim:

1. The method of determining the porosity of a substance sample confined in a sample holder, which includes: evacuating the air from the holder and sample, isolating a quantity of gas under super atmospheric pressure, connecting the quantity of gas under pressure to the sample and holder to cause the gas to permeate the sample and to cause a drop in gas pressure in said isolated quantity of gas under pressure, subjecting said isolated quantity of gas at the lowered pressure to a displacing medium to bring the pressure of said isolated quantity at lowered pressure back up to the first mentioned pressure, and measuring the displacement of said displacing medium, so as to determine the quantity of gas that was required to permeate the sample.

2. The method of determining the porosity of a substance sample confined in a sample holder, which includes: evacuating the air from the holder and sample, isolating a quantity of gas under pressure, connecting the quantity of gas under pressure to the sample to cause the gas to permeate the sample and to cause a drop in gas pressure in said isolated quantity of gas under pressure, then increasing the pressure of said quantity of gas at the lowered pressure up to the first mentioned pressure, and determining, from the work required to produce said increase, the volume of gas required to permeate the sample.

3. The method of determining the porosity of a substance sample confined in a sample holder, which includes: isolating a quantity of gas under pressure and indicating that pressure, connecting the sample to said isolated quantity of gas under pressure to cause the gas under pressure to permeate the sample and reduce the pressure of said quantity of gas, subjecting the gas at the lowered pressure to displacing means to increase the pressure up to said indicated pressure, and measuring the displacing volume required to increase said pressure as aforesaid, to determine the volume of gas required to permeate said sample and holder.

4. The method of determining the porosity of a substance sample confined in a sample holder, which includes: isolating within a given volume a quantity of gas under pressure, connecting the sample holder to said isolated quantity of gas to permit the gas to permeate said sample, compressing said gas by reducing said volume until said pressure is restored, and measuring the volume reduction to determine the quantity of gas required to permeate the sample and holder.

5. In a porosimeter, a sample holder, a chamber for holding a quantity of gas under a given super atmospheric pressure, sensitive pressure indicating means to indicate the pressure in said chamber, means for connecting said chamber to the sample holder to cause the gas to fill the holder and permeate a sample in said holder, means for increasing the expanded pressure of gas in said chamber up to said given pressure, and means responsive to operation of said last-defined means for indicating the volume of gas at the said given pressure required to fill the sample holder and permeate the sample therein.

6. In the combination defined in claim 5, and means for evacuating said sample holder before connecting the same to said chamber.

7. In a porosimeter, a sample holder, a displacement chamber for holding a quantity of gas under a given initial pressure, pressure indicating means for indicating the pressure in said chamber, means for connecting said sample holder to said displacement chamber to expand the gas into said holder and permeate the sample in the sample holder, means for compressing the expanded gas in said chamber up to its said initial pressure, and means responsive to operation of said compressing means to determine the volume of the gas at said initial pressure required to permeate the sample and fill said sample holder.

8. In the combination defined in claim 7, and means for evacuating the sample holder and sample therein before connecting the same to said displacement chamber.

9. In a porosimeter, a sample holder, a displacement chamber for holding a quantity of gas under initial pressure, pressure indicating means for indicating the pressure in said chamber, means for connecting said sample holder to said displacement chamber to expand the gas and permeate the sample in the sample holder, means to introduce incompressible liquid under pressure to said chamber to compress the expanded gas therein back to said initial pressure, and means for measuring the displaced volume of said liquid to indicate the volume of gas introduced into said sample holder.

10. In the combination defined in claim 9, and means for evacuating said sample holder and sample therein before connecting the same to said displacement chamber.

11. In a porosimeter, a sample holder, a displacement chamber for holding a quantity of gas under initial pressure, pressure indicating means for indicating the pressure in said chamber, means for connecting said sample holder to said displacement chamber to expand the gas and permeate the sample in the sample holder, a measuring pump to pump incompressible liquid into said chamber to compress the expanded gas back to said initial pressure, said pump serving to measure the volume of liquid pumped to indicate the volume of gas used to permeate the sample and fill the sample holder.

12. In a porosimeter, a sample holder, means for connecting the same to evacuating means, whereby said holder and sample therein may be evacuated, displacement chamber means, a valved connection between said sample holder and said displacement chamber means, a valved connection between said displacement chamber means and a source of gas under pressure, whereby a whereby a quantity of gas under an initial pressure may be isolated in said displacement chamber means and may then be expanded into the evacuated holder and sample, pressure balance tube means connected to said displacement chamber means and to a pressure balance reservoir, means for introducing a liquid into said displacement chamber means, whereby the gas pressure may be raised in said sample holder and in said displacement chamber means, and means for determining the volume of liquid introduced into said displacement chamber means, whereby upon restoring gas pressure to said initial pressure the determined volume of liquid may directly indicate the volume of gas admitted to said holder and sample.

13. In the combination defined in claim 12, said means for introducing liquid comprising a measuring pump.

14. In the combination defined in claim 12, said displacement chamber means being calibrated in volume units.

15. The method of determining the porosity, or the solid volume of a substance sample in a sample holder, which includes isolating a relatively small quantity of gas under relatively high pressure, connecting the quantity of gas under pressure to the sample holder to cause the gas to permeate the sample and holder and to cause a drop in gas pressure in said isolated quantity of gas under pressure, compressing said isolated quantity of gas at lowered pressure to the first mentioned pressure, observing the work required to compress to said first mentioned pressure, whereby the quantity of gas that was required to permeate and fill the sample and the sample holder may be determined and applying a correction factor for the atmospheric air in the sample and holder.

16. In a device of the character indicated, a sample holder, means for establishing a relatively high reference pressure which may be rapidly and accurately reproduced, which means includes a relatively large constant volume gas reservoir, a pressure balancing tube of capillary size to receive a liquid, means connecting one end of said pressure balancing tube to said reservoir, a displacement chamber, and means for selectively connecting the same to said sample holder, means connecting the other end of said pressure balancing tube to said displacement chamber, whereby a very accurately reproducible reference pressure may be quickly established in said displacement chamber so that upon discharge of isolated gas at said pressure into said holder, and upon thereafter compressing the expanded gas back to said reference pressure, the work expended in such compression may be a direct indication of the porosity of a sample in said holder.

17. In the combination defined in claim 16, and a valve between said displacement chamber and said pressure balancing tube.

18. In a device of the character indicated, a relatively large constant volume reservoir for fluid under relatively high pressure, a pressure balancing tube of capillary size to receive a liquid, one end of said tube being connected to said reservoir, a displacement chamber, a connection for the other end of said pressure balancing tube to said displacement chamber, a valve in said connection, a connection from said displacement chamber to a source of gas under relatively high pressure, a valve in said latter connection, a sample holder, a connection from said sample holder to said displacement chamber, a valve in said latter connection, means for forcing a liquid into said displacement chamber and for measuring the volumetric displacement of said liquid.

References Cited in the file of this patent

UNITED STATES PATENTS

| | | |
|---|---|---|
| 2,323,556 | Mattocks | July 6, 1943 |
| 2,327,642 | Horner | Aug. 24, 1943 |
| 2,537,668 | Hebard | Jan. 9, 1951 |
| 2,604,779 | Purcell | July 29, 1952 |
| 2,662,400 | Weiner et al. | Dec. 15, 1953 |
| 2,705,418 | Reichertz | Apr. 5, 1955 |

FOREIGN PATENTS

| | | |
|---|---|---|
| 598,273 | Great Britain | Feb. 13, 1948 |

OTHER REFERENCES

Publication, Bureau of Mines Report of Investigations (R. I. 4548), "Method for Determining Porosity," September 1949, pgs. 2 to 8 and Figs. 1, 3 and 5.

Publication, Effect of Pressure on the Reduction of Pore Volume of Consolidated Sandstones, by D. S. Hughes et al., Geophysics, April 1953, pp. 298–301 and 308.